Oct. 22, 1968  C. L. WEBER, JR  3,407,010
BRAKE CYLINDER PRESSURE RETAINING VALVE
Filed Aug. 18, 1965  3 Sheets-Sheet 1

INVENTOR.
CHARLES L. WEBER JR
BY
*A. A. Steinmiller*
ATTORNEY

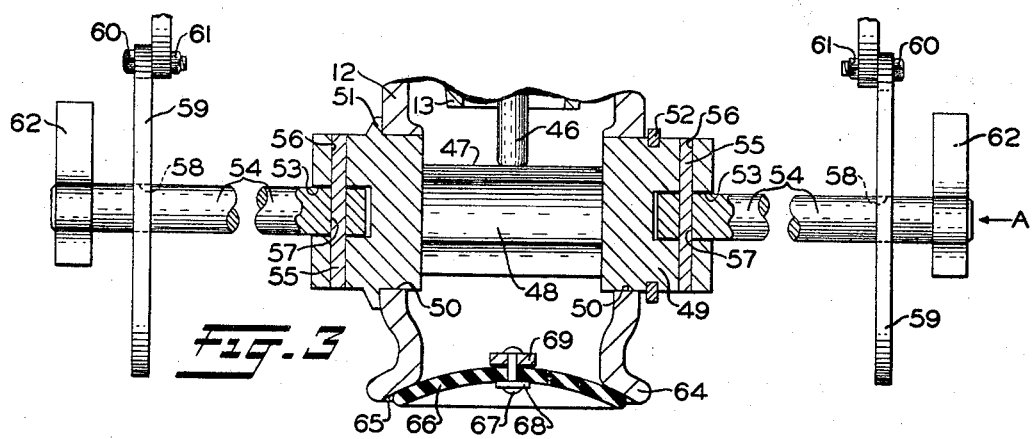
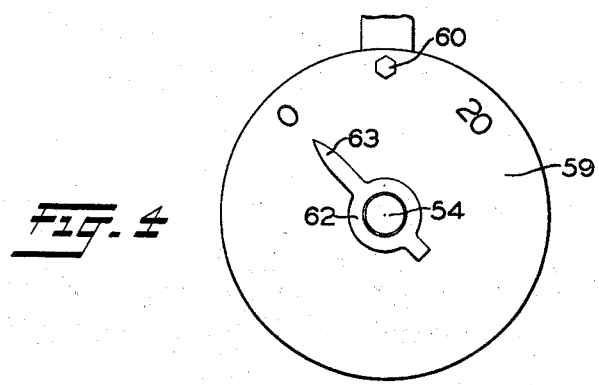
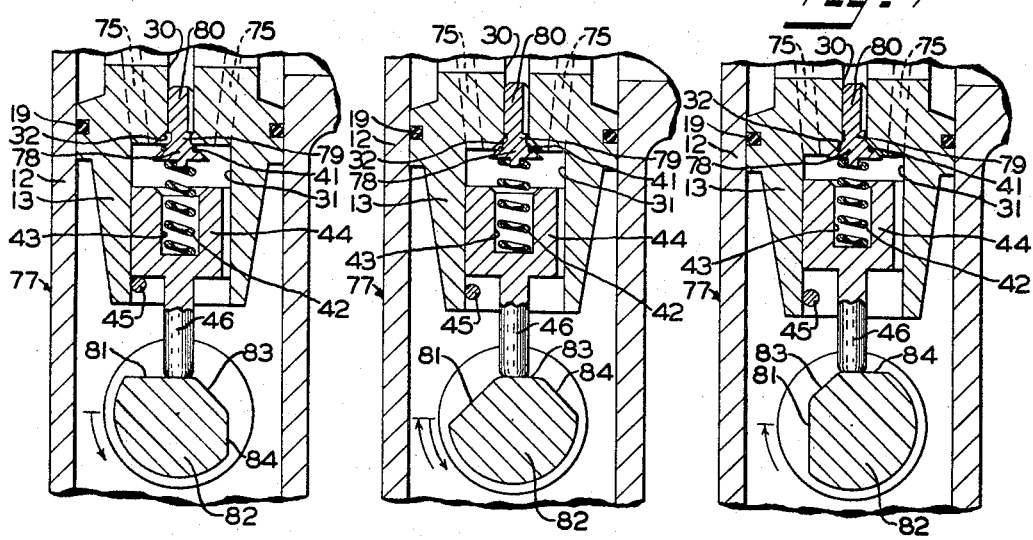
INVENTOR.
CHARLES L. WEBER JR
BY
*A. A. Steinmeier*
ATTORNEY Oct. 22, 1968  C. L. WEBER, JR  3,407,010
BRAKE CYLINDER PRESSURE RETAINING VALVE
Filed Aug. 18, 1965  3 Sheets-Sheet 3

INVENTOR.
CHARLES L. WEBER JR
BY
ATTORNEY

United States Patent Office 3,407,010
Patented Oct. 22, 1968

3,407,010
BRAKE CYLINDER PRESSURE
RETAINING VALVE
Charles L. Weber, Jr., Irwin, Pa., assignor to Westinghouse Air Brake Company, Wilmerding, Pa., a corporation of Pennsylvania
Filed Aug. 18, 1965, Ser. No. 480,666
11 Claims. (Cl. 303—75)

ABSTRACT OF THE DISCLOSURE

A brake cylinder pressure retaining valve device, for connection to the exhaust passageway of a railway car brake control valve device, which may be manually set in either a direct release or a pressure-retaining position, and which embodies therein a cartridge-type retaining valve unit that may be readily removed and replaced with a new unit by relatively unskilled workmen.

---

In order to insure safe control of railway trains while descending long grades that require one or more successive brake applications, manually adjustable retaining valve devices have long been employed on the cars to limit the release of fluid under pressure from the brake cylinder devices on the cars for thereby maintaining the car brakes applied with limited braking force while the train brake pipe and associated reservoirs of the brake system are being recharged in preparation for a subsequent brake application.

Pressure retaining valve devices heretofore customarily used on railway cars for retaining brake cylinder pressure have comprised a body, usually of cast construction and secured to one end of the car near the top or roof. This body contained therein a manually operable rotary plug type of valve selectively rotatable to a plurality of positions for controlling the flow of fluid under pressure from the brake cylinder device directly to atmosphere or via a corresponding one of a plurality of check valves, each normally spring biased against its seat formed at one end of a corresponding bushing that is press-fitted into one of a plurality of bores in the retaining valve body. Consequently, such devices require removal from the car of the entire pressure retaining valve device and transportation to a railway repair shop whenever repairs or reconditioning becomes necessary.

It is the general purpose of this invention to provide a novel, inexpensive brake cylinder pressure retaining valve device for use with a brake control valve device in a railway car brake control equipment, and capable of repairs or reconditioning in the field by relatively unskilled workmen. Moreover, such novel brake cylinder pressure retaining valve device may be mounted on the end of a pipe connected to the exhaust port of the brake control valve device and arranged so as to be manually set in either a direct release or a pressure-retaining position by a trainman standing at either side of the car and without the necessity of his climbing to the top of the car.

According to the present invention, a novel brake cylinder pressure retaining valve device is provided which embodies therein a cartridge type retaining valve unit that may be readily removed and replaced with a new unit by relatively unskilled workmen in the field. The replaceable cartridge type valve unit may include a valve support or spider element of molded plastic material suitably secured in the body of the valve device and having a check valve spring-biased into seated relation on a valve seat formed on the support element and a second valve operable from an unseated into a seated position on a valve seat formed on the support element by a manually rotatable cam.

The manually rotatable cam is carried on a shaft connected to each of two handles, one on each side of the car. Each handle may have a plurality of positions corresponding to the handle positions of brake cylinder pressure retaining valve devices presently used on American railroads. The position of the handle determines whether the second valve is unseated or seated. When the second valve is unseated, fluid under pressure is exhausted at a controlled rate from the brake cylinder past the unseated second valve. When the second valve is seated, the exhaust of fluid under pressure from the brake cylinder is directed solely past the check valve which traps a chosen degree of pressure in the brake cylinder depending on the force of a spring seating the check valve.

In the accompanying drawings:

FIG. 1 is a diagrammatic view, in outline, showing a fluid pressure brake equipment for a railway car constructed in accordance with a first embodiment of the invention and including a novel two-position brake cylinder pressure retaining valve device mounted on the end of a brake cylinder exhaust pipe connected to the exhaust port of a brake control valve device, such as the well-known AB valve device.

FIG. 3 is a partial vertical cross-sectional view, taken substantially along the line III—III of FIG. 2 and looking in the direction of the arrows, showing further structural details of the brake cylinder pressure retaining valve device and how it is connected to a pair of valve operating handles located on the respective opposite sides of a railway car.

FIG. 4 is an elevational view looking in the direction of the arrow A shown in FIG. 3, showing the operating handle in relation to its associated escutcheon plate.

FIG. 5 is a partial vertical cross-sectional view of a second embodiment of the invention embodying a three-position brake cylinder pressure retaining valve device and shown in its first position in which an unrestricted and direct communication is established between a brake cylinder device and atmosphere.

FIG. 6 is a partial vertical cross-sectional view of the three-position brake cylinder pressure retaining valve device of FIG. 5 shown in the second of its three positions in which a restricted communication is established between a brake cylinder device and atmosphere.

FIG. 7 is a partial vertical cross-sectional view of the three-position brake cylinder pressure retaining valve device of FIG. 5 shown in the third of its three positions in which a chosen pressure is retained in a brake cylinder device.

Figure 8:
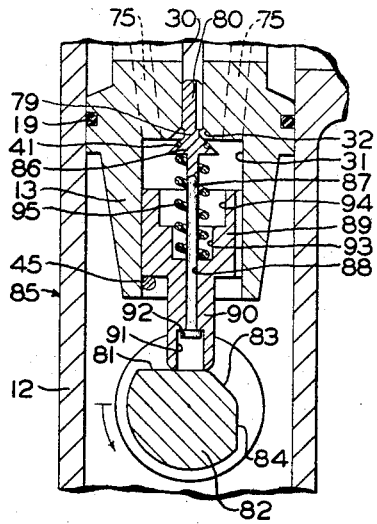

FIG. 8 is a partial vertical cross-sectional view of a third embodiment of the invention embodying a three-position brake cylinder pressure retaining valve device that differs in certain structural details from the brake cylinder pressure retaining valve device shown in FIG. 5 and shown in its first position in which an unrestricted and direct communication is established between a brake cylinder device and atmosphere.

Figure 9:
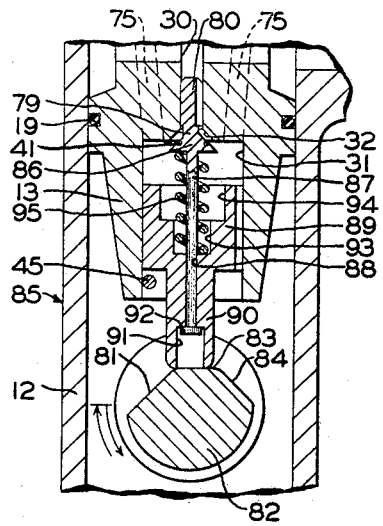

FIG. 9 is a partial vertical cross-sectional view of the brake cylinder pressure retaining valve device of FIG. 8 shown in the second of its three positions in which a restricted communication is established between a brake cylinder device and atmosphere.

Figure 10:
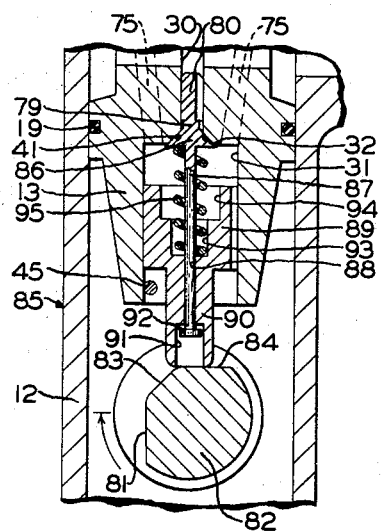

FIG. 10 is a partial vertical cross-sectional view of the brake cylinder pressure retaining valve device of FIG. 8 shown in the third of its three positions in which a chosen pressure is retained in a brake cylinder device.

Description—FIGS. 1 to 4

Figure 1:
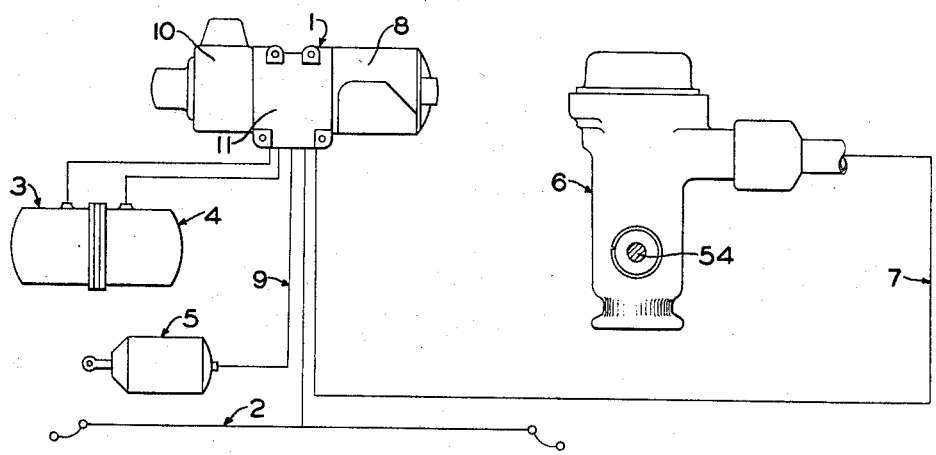

In FIG. 1 of the drawings, there is shown a railway car fluid pressure brake system embodying a novel brake cylinder pressure retaining valve device constructed in accordance with one embodiment of the invention. This railway car fluid pressure brake system comprises a brake controlling valve device 1 to which is connected the usual brake pipe 2, auxiliary reservoir 3, emergency reservoir 4, a brake cylinder device 5, and a novel brake cylinder pressure retaining valve device 6 mounted on the end of a brake cylinder exhaust pipe 7 that is connected to the exhaust port of the brake controlling valve device 1.

The brake controlling valve device 1 shown in FIG. 1 of the drawings is of the AB type which may be of substantially the same construction and have the same operating characteristics as the brake controlling valve device fully described in Patent 2,031,213 issued Feb. 18, 1936 to Clyde C. Farmer and assigned to the assignee of the present invention, in view of which it is deemed unnecessary to show and describe this valve device in detail.

Briefly, however, the brake controlling valve device 1 comprises a service portion 8 adapted to operate upon both a service and an emergency rate of reduction in pressure of fluid in brake pipe 2 for supplying fluid under pressure from the auxiliary reservoir 3 to a brake cylinder pipe 9 and thence to the brake cylinder device 5 for, upon a service rate of reduction in brake pipe pressure, effecting a service application of the brakes on the vehicle. The brake controlling valve device 1 also comprises an emergency portion 10 which is adapted to operate only upon an emergency rate of reduction in pressure of fluid in brake pipe 2 for supplying fluid under pressure from the emergency reservoir 4 to pipe 9 and thence to brake cylinder device 5, wherein such pressure, in addition to that provided from the auxiliary reservoir 3 by operation of the service portion 8, is adapted to operate the brake cylinder device 5 for effecting an emergency application of the brakes on the vehicle. Upon recharging of the brake pipe 2, the brake controlling valve device 1 is adapted to operate to open pipe 9 to atmosphere for releasing fluid under pressure therefrom and from the brake cylinder device 5 for releasing the brakes on the vehicle and at the same time to effect recharging of the auxiliary reservoir 3 and the emergency reservoir 4 in the usual well-known manner. The service and emergency portions 8 and 10, respectively, of the brake controlling valve device 1 are mounted on opposite faces of a pipe bracket 11 to which all pipe connections to said valve device are made, as shown in FIG. 1 of the drawings.

Figure 2:
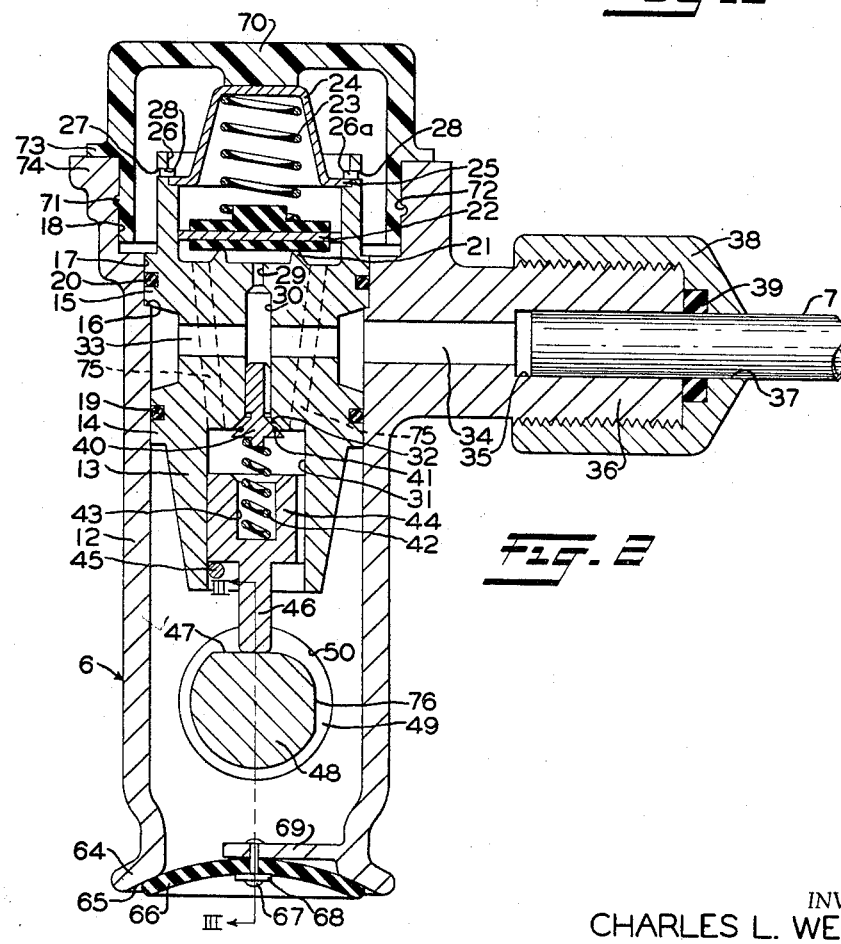
FIG. 2 is a vertical cross-sectional view, at an enlarged scale, of the novel brake cylinder pressure retaining valve device of FIG. 1 showing the structural details of this valve device.

The brake cylinder pressure retaining valve device 6, as shown in cross-section in FIG. 2, comprises a generally cylindrical hollow body 12 which may be a die casting of metal or plastic that requires no machining and therefore is comparatively inexpensive to manufacture.

Disposed within the generally cylindrical hollow body 12 is a cartridge-type retaining valve mechanism or unit that comprises a cylindrical body 13 that may be a metallic or plastic die casting which is provided intermediate its ends with two spaced apart collars 14 and 15 of unequal diameter, the larger collar 15 being supported by an annular shoulder 16 formed by the lower end of a first counterbore 17 in the body 12 and coaxial with a second counterbore 18 also formed in the body 12. The collar 14 is provided with peripheral annular groove in which is disposed an O-ring 19 that forms a fluid tight seal with the wall surface of the hollow body 12. Likewise, the collar 15 is provided with a peripheral annular groove in which is disposed an O-ring 20 that forms a fluid tight seal with the wall surface of the counterbore 17.

As shown in FIG. 2, the body 13 is, at its upper end, in the form of a cup, the bottom of which is provided with an annular valve seat 21 against which a flat disc-type check or one-way valve 22 is normally biased by a spring 23 which is interposed between the check valve 22 and a cup-shaped spring cage 24 that is provided with an outturned flange 25. This flange 25 is retained in the bottom of a counterbore 26 formed in the upper end of the body 13 by the in-turned ends of semi-circular snap ring 26a that is disposed in a groove 27 formed on the periphery of the body adjacent its upper end, it being understood that these in-turned ends of the semi-circular snap ring 26a extend respectively through two coaxial and diametrically arranged bores 28 formed in the wall of the body 13 and opening at their outer end into the groove 27 and at their inner end into the cup formed at the upper end of the body 13.

Formed in the body 13 and opening at one end within the annular valve seat 21 is a bore 29 the opposite end of which opens into one end of a first coaxial counterbore 30 also formed in the body 13. The opposite end of this first counterbore 30 opens into a second coaxial counterbore 31 and has formed thereon an annular valve seat 32.

Extending through the cylindrical body 13 is a passageway 33 the axis of which intersects at a right angle the axis of the counterbore 30 this passageway being so located that its opposite ends open at the peripheral surface of the body 13 substantially midway between the collars 14 and 15 formed thereon. While the body 13 of the cartridge type retaining valve mechanism is disposed with the collar 15 supported on the annular shoulder 16, as shown in FIG. 2 of the drawings, the passageway 33 is coaxial with a passageway 34 formed in the body 12. One end of the passageway 34 opens into the interior of the body 12 substantially midway the collars 14 and 15 on the body 13 and the opposite end of this passageway opens into a coaxial counterbore 35 formed in an externally threaded boss 36 that is integral with the body 12. One end of the brake cylinder exhaust pipe 7 extends through a bore 37 in a nut 38 and an O-ring 39 and is received in the counterbore 35. The nut 38 has a screw-threaded engagement with the external screw threads formed on the boss 36 and serves to squeeze the O-ring 39 against the periphery of the pipe 7 to form a fluid tight seal therewith when the nut is tightened to the position shown in FIG. 2.

Disposed in the counterbore 30 in the body 13 is the fluted stem of a poppet-type valve 40, the seating surface of which is provided with an annular groove in which is disposed an O-ring 41 that is adapted to make a seal with the annular valve seat 32 when the poppet-type valve 40 is moved upward in a manner hereinafter described from the position shown in FIG. 2 to close communication between the counterbores 30 and 31.

While the poppet-type valve 40 occupies its unseated position, in which it is shown in FIG. 2 of the drawings, it is supported on the upper end of an uncompressed spring 42 the lower end of which rests on the bottom of a blind bore 43 formed in a cylindrical follower member 44 that is slidable disposed in the counterbore 31 in the body 13 and retained therein by a pin 45 extending across the counterbore 31 beneath the cylindrical follower member 44 and having its opposite ends anchored in corresponding bores (not shown) formed in the body 13 adjacent the lower end thereof.

The cylindrical follower member 44 is preferably provided with longitudinal grooves or flutes, as shown, and has formed integral therewith a downwardly extending stem 46. The lower end of stem 46, as shown in FIGS. 2 and 3, abuts a first flat or cam surface 47 formed on a cam element 48 that is located intermediate the ends of a shaft 49.

As shown in FIG. 3 of the drawings, the shaft 49 is journaled in two coaxial bores 50 formed in the body 12 adjacent the lower end thereof. The shaft 49 is provided adjacent its lefthand end with a collar 51 and adjacent its right-hand end with a peripheral annular groove in which is disposed a snap ring 52 whereby the collar 51 and snap ring 52 cooperate to prevent the removal of the shaft 49 from the body 12.

Each of the opposite ends of the shaft 49 is provided with a blind bore 53 in which is received one end of one of a pair of identical and oppositely extending operating rods 54 each of which is operatively connected to the corresponding end of the shaft 49 by one of a pair of pins 55 that extends through a corresponding bore 56 in the shaft 49 and a coaxial bore 57 in the corresponding rod 54.

The coaxial axes of the rods 54 are disposed at a right angle to the longitudinal axis of the railway freight car and each of these rods extends through a bore 58 formed in a corresponding escutcheon plate 59 that is secured to the respective side of the car body by a bolt 60 and a nut 61 as shown in FIG. 3. One of a pair of operating handles 62 is secured to the respective portion of each of the operating rods 54 extending beyond the corresponding escutcheon plate 59 by any suitable means (not shown). Disposed at one end of each handle 62 is a pointed 63 for manual movement into alignment with either a numeral 0 or a numeral 20 cast or stenciled on the corresponding escutcheon plate 59 when the respective handle 62 is grasped by the fingers of a trainman and thereafter rotated in one direction or in an opposite direction.

As shown in FIG. 2 of the drawings, the lowermost portion of the body 12 is provided with an out-turned flange 64 having a substantially conical inner surface 65. Resting against the conical inner surface 65 of the flange 64 is the outer peripheral portion of a dished circular shield 66, which is preferably formed of a resilient material such as rubber. This shield 66 is held in place by suitable means such as, for example, a centrally disposed rivet 67 that extends through coaxial bores in a washer 68, the shield 66, and a horizontally disposed inwardly extending arm 69 that is formed integral with the body 12. The circumferential surface of the shield 66 is adapted to engage the conical surface 65 for preventing access to the interior of the body 12 of particles of foreign matter or by nest-building insects such as, for example, mud wasps. A plurality of notches or grooves are formed in the outer edge of the shield 66 for preventing sealing contact thereof with the inner surface 65. It will be noted that the surface 65 on the out-turned flange 64 of the body 12 extends somewhat beyond the rubber shield 66 so as to provide an adequate protection against the formation of ice over the opening in the lower end of the body, and that the shield 66 has sufficient area and flexibility to insure its displacement under the pressure of fluid released from the brake cylinder device 5 in a manner hereinafter described to eject any foreign matter that might reach it.

The upper end of the counterbore 18 in the body 12 is closed by a cup-shaped cap or cover 70 that may be constructed of some suitable material such as, for example, plastic. The cover 70 is provided intermediate its ends with an external bead 71 which is adapted to fit into a corresponding annular groove 72 formed in the wall surface of the counterbore 18 in the body 12, and with an annular out-turned flange 73 which abuts a corresponding out-turned annular flange 74 formed integral with the body 12 at the upper end thereof when the cup-shaped cover 70 is pushed downward into the counterbore 18.

The body 13 of the brake cylinder retaining valve mechanism is provided with two passageways 75 (shown in broken lines) which open at one end into the counterbore 31 and at the opposite end into the cup-shaped upper end of the body 13 outside of the annular valve seat 21.

*Operation—FIGS. 1 to 4*

As shown in FIG. 1 of the drawings, it will be seen that the brake cylinder pressure retaining valve device 6 is adapted to be associated with a fluid pressure brake equipment comprising the brake controlling valve device 1, the brake pipe 2, the auxiliary reservoir 3, the emergency reservoir 4 and the brake cylinder device 5, it being understood that the brake controlling valve device 1 is operative in the usual manner in effecting a release of the brakes to vent fluid under pressure from the brake cylinder device 5 by way of the brake cylinder exhaust pipe 7 and the brake cylinder pressure retaining valve device 6.

Fluid under pressure thus vented from the brake cylinder device 5 flows via the brake cylinder pipe 9, the brake controlling valve device 1 which it may be assumed is in its release position, brake cylinder exhaust pipe 7, counterbore 35 (FIG. 2), and the passageways 34 and 33 to the interior of the counterbore 30. Assuming that the handles 62 are disposed in the nonpressure retaining position shown in FIG. 4, in which the pointer 63 is in alignment with the numeral 0 on the escutcheon plate 59, it will be understood that the cam element 48 occupies the position shown in FIG. 2 so that the lower end of the stem 46 of cylindrical follower member 44 rests on the flat surface 47 of the cam element 48. In this position of the cam element 48 and the cylindrical follower member 44, the spring 42 is not compressed and consequently supports the poppet-type valve 40 in the position shown in FIG. 2 in which position the O-ring 41 is disposed below and out of seating contact with the annular valve seat 32. Therefore, the flow of fluid under pressure from the brake cylinder device 5 is continued from the counterbore 30 past the unseated poppet-type valve 40 to the interior of the counterbore 31. Fluid under pressure supplied from the brake cylinder device 5 to the upper end of the counterbore 31 will flow through the grooves or flutes provided in the outer surface of the cylindrical follower member 44 to the interior of the hollow body 12 and thence past the rubber shield 66, which is deflected thereby, to atmosphere. It will be apparent that when fluid under pressure thus discharged from the brake cylinder device 5 is reduced to substantially atmospheric pressure, the shield 66 will return to the position shown in FIG. 2 in which its outer peripheral portion lies in contact with the conical inner surface 65 on the out-turned annular flange 64.

From the foregoing, it is apparent that when a brake release is effected while the handles 62 occupy the position shown in FIG. 4, no fluid under pressure is retained in the brake cylinder device 5.

If it is desired to retain a certain pressure in the brake cylinder device 5 when a brake release and recharge of the brake equipment is effected while a train is descending a long grade, prior to beginning the descent, the train will be stopped and a trainman standing at either side of each car, assuming each car in the train to be provided with the brake cylinder pressure retaining valve device 6 shown in FIGS. 1 to 4, inclusive, of the drawings, will, by gripping the corresponding handle 62 with the fingers of his hand, manually rotate this handle in a clockwise direction from the position shown in FIG. 4 to a position in which the pointer 63 of the handle 62 is in alinement with the numeral 20 on the corresponding escutcheon plate 59.

As one or the other of the handles 62 is rotated as described above, the operating rods 54 (FIG. 3) and shaft 49 are rotated therewith. Since the cam element 48 is integral with the shaft 49, it is likewise rotated from the position shown in FIG. 2 in which the lower end of the stem 46 abuts the first flat surface 47 on the cam element 48 to a position in which the lower end of the stem 46 abuts a second flat surface 76 formed on this cam element. The second flat surface 76 is farther from the axis of rotation of the cam element 48 and shaft 49 than is the first flat surface 47. Therefore, as the cam element 48 and shaft 49 are rotated from the position shown in FIG. 2 in which the lower end of the stem 46 abuts the first flat surface 47 on the cam element 48 to the position in which the lower end of this stem 46 abuts the second flat surface 76 on this cam element, the stem 46, cylindrical follower member 44, spring 42 and poppet-type valve 40 are moved upwardly until the O-ring 41 carried by the valve 40 is moved into seating contact with the annular valve seat 32 after which the spring 42 is compressed as the cylindrical follower 44 and its stem 46 are further moved upward until the lower end of the stem 46 abuts the second flat surface 76, or, in other words, until the cam element 48 has rotated counterclockwise from the position shown in FIG. 2 through an angle of 90°. As the spring 42 is thus compressed, it is rendered effective to bias the O-ring 41 carried by the poppet-type valve 40 against the annular valve seat 32 with sufficient force to provide a seal which prevents flow of fluid under pressure from the counterbore 30 to the counterbore 31.

Now when the pressure in the brake pipe 2 is increased to the normal charged value and the brake controlling valve device 1 is moved to its release position in response to this increase in pressure in the brake pipe 2, fluid under pressure will flow from the brake cylinder device 5 to the counterbore 30 in the manner hereinbefore described. Since the poppet-type valve 40 is now seated, the fluid under pressure supplied to the interior of the counterbore 30 flows through the bore 29 and increases the pressure on the lower side of the check valve 22 within the annular valve seat 21. When the pressure acting on the area of the check valve 22 within the annular valve seat 21 has been increased to a chosen pressure such as, for example, twenty pounds per square inch, the check valve 22 will be moved upwardly away from the annular valve seat 21 against the yielding resistance of the spring 23. Fluid under pressure supplied from the brake cylinder device 5 to the interior of the counterbore 30 will now flow to atmosphere via the bore 29, past the now unseated check valve 22, passageways 75, counterbore 31, the interior of the body 12 and past the dished circular shield 66 until the pressure in the brake cylinder device 5 is reduced to the aforementioned twenty pounds per square inch at which time the spring 23 will move the check valve 22 into seating contact with the annular valve seat 21 to prevent a further reduction in pressure in the brake cylinder device 5. Thus a pressure of, for example, twenty pounds per square inch, is retained in the brake cylinder device 5 to maintain the brakes applied, while the brake control equipment is released and recharged preparatory to effecting a second or successive brake application as a train descends a long grade in mountainous terrain.

From the foregoing, it is apparent that the brake cylinder pressure retaining valve device 6 is operative accordingly as handles 62 are manually positioned in one or the other of two positions to provide for a complete release of fluid under pressure from the brake cylinder device 5 or to retain a chosen pressure in this brake cylinder device 5 when the brake pipe 2 is recharged to its normal charged value subsequent to a brake application to cause the brake controlling valve device 1 to return to its brake release position and the auxiliary reservoir 3 and the emergency reservoir 4 to be recharged to the normal charged pressure carried in the brake pipe.

*Description—FIGS. 5 to 7*

FIGS. 5, 6 and 7 show a portion of a three-position brake cylinder pressure retaining valve device that constitutes a second embodiment of the invention. The brake cylinder pressure retaining valve device shown in FIGS. 5, 6 and 7 is identical in construction to the brake cylinder pressure retaining valve device shown in FIGS. 1, 2, 3 and 4 except for the poppet-type valve and the cam element. Accordingly, like reference numerals have been used to designate the structure shown in FIGS. 5, 6 and 7 which is identical with that shown in FIGS. 1, 2, 3 and 4 and already described. Only such features of the structure and operation of the embodiment of FIGS. 5, 6 and 7 which differ from that of the embodiment of FIGS. 1, 2, 3 and 4 will be hereinafter described.

According to the embodiment of the invention shown in FIGS. 5, 6 and 7, this three-position brake cylinder pressure retaining valve device 77 comprises a poppet-type valve 78 that replaces the poppet-type valve 40. The poppet-type valve 78 is provided with a cylindrical portion 79 that is disposed between the inclined seating surface of the valve and a fluted portion 80. The seating surface of the poppet-type valve 78 is provided with an annular groove in which is disposed an O-ring 41, as in the first embodiment of the invention, that is adapted to make a seal with the annular valve seat 32 when the poppet-type valve 78 is moved upwardly from its first position in which it is shown in FIG. 5 to its third position in which it is shown in FIG. 7.

As in the first embodiment of the invention, the poppet-type valve 78, while it occupies its unseated position in which it is shown in FIG. 5, is supported on the upper end of the uncompressed spring 42, the lower end of which rests on the bottom of the blind bore 43 in the cylindrical follower member 44 disposed in the counterbore 31 in the body 13.

As shown in FIG. 5 of the drawings, the stem 46 of the cylindrical follower member 44 abuts a first flat or cam surface 81 formed on a cam element 82 that is located on a shaft corresponding to the shaft 49 of the first embodiment of the invention. The cam element 82 is provided with a second flat surface 83 and a third flat surface 84 each of the three flat or cam surfaces forming an angle of substantially 45° with an adjacent cam surface.

It will be understood that the shaft on which the cam element 82 is formed is connected by the pair of rods 54 to corresponding handles 62 in the same manner as hereinbefore described in connection with the first embodiment of the invention. It will be noted, however, that in this second embodiment of the invention each of the handles 62 is associated with an escutcheon plate that differs from the escutcheon plate 59 in that it has cast or stenciled thereon substantially midway the numeral 0 and the numeral 20 the indicia SLOW RELEASE, it being understood that when either handle 62 is manually rotated by a trainman to the position in which the pointer 63 of the handle is in alignment with the indicia SLOW RELEASE on the corresponding escutcheon plate, the lower end of the stem 46 abuts the second flat or cam surface 83 on the cam element 82 as shown in FIG. 6 of the drawings.

*Operation—FIGS. 5 to 7*

Assuming that the handles 62 are disposed in the non-pressure retaining position in which the pointer 63 of each handle is in alignment with the numeral 0 on the corresponding escutcheon plate, it will be understood that the cam element 82 occupies the position shown in FIG. 5 so that the lower end of the stem 46 of the cylindrical follower member 44 rests on the flat surface 81 of the cam element 82 as shown in this figure. In this position of the cam element 82 and the cylindrical follower element 44, the spring 42 is not compressed. Consequently, this spring 42 supports the poppet-type valve 78 in the position shown in FIG. 5 in which position the O-ring 41 carried by this valve is disposed below and out of seating contact with the annular valve seat 32 and the cylindrical portion 79 is disposed below the lower end of the counterbore 30 so that this portion 79 does not act to restrict the flow of fluid under pressure from the counterbore 30 to the counterbore 31. Consequently, when a brake release is effected, fluid under pressure will flow unrestrictedly from the brake cylinder device 5 to atmosphere via the path hereinbefore described in detail in connection with the first embodiment of the invention until the pressure in the brake cylinder device 5 is reduced to substantially atmospheric pressure.

If it is desired to provide a slow or restricted rate of release of fluid under pressure from the brake cylinder device 5 when a brake release and recharge of the brake equipment is effected while a train is descending a long grade, prior to beginning the descent the train will be stopped and a trainman standing at either side of each car, assuming each car in the train to be provided with the brake cylinder pressure retaining valve device 77 shown in FIGS. 5 to 7, inclusive, of the drawings, will, by gripping the corresponding handle 62 with the fingers of his hand, manually rotate this handle in a clockwise direction, as viewed in FIG. 4, from the position in which the pointer 63 of this handle is in alignment with the numeral 0 on the corresponding escutcheon plate to the position in which this pointer 63 is in alignment with the indicia SLOW RELEASE on this escutcheon plate.

As one or the other of the handles 62 is rotated as described above, the operating rods 54 and the cam element 82 are rotated therewith so that the cam element 82 is rotated from the position shown in FIG. 5 to the position shown in FIG. 6, or in other words from its first position to its second position. The second surface 83 on the cam element 82 is farther from the axis of rotation of this cam element 82 than is the first flat surface 81. Accordingly, as the cam element 82 is rotated from the position shown in FIG. 5 to the position shown in FIG. 6, the cylindrical follower member 44, its stem 46, the spring 42 and the poppet-type valve 78 are moved upwardly from the position, shown in FIG. 5, in which the cylindrical portion 79 of the poppet-type valve 78 is disposed below the lower end of the counterbore 30 in the body 13 to the position shown in FIG. 6, in which the upper end of cylindrical portion 79 of the valve 78 is disposed within the lower end of the counterbore 30. While the upper end of the cylindrical portion 79 is disposed within the lower end of the counterbore 30, the flow of fluid under pressure from the counterbore 30 to the counterbore 31 is restricted to the annular passageway formed between the wall surface of the counterbore 30 and the peripheral surface of the cylindrical portion 79 of the poppet-type valve 78. Accordingly, the cross-sectional area of this annular passageway is equal to the difference between the cross-sectional area of the counterbore 30 and the cross-sectional area of the cylindrical portion 79 of the poppet-type valve 78. It is apparent that the cross-sectional area of this annular passageway is less than the cross-sectional area of the passageway provided for the flow of fluid under pressure from the counterbore 30 to the counterbore 31 while the poppet-type valve 78 occupies the position shown in FIG. 5, in which position the cylindrical portion 79 of the poppet-type valve 78 is disposed out of and below the lower end of the counterbore 30 and only the fluted portion of this valve is disposed within the counterbore 30. Therefore, while the cylindrical portion 79 is disposed within the counterbore 30, as shown in FIG. 6 of the drawings, this cylindrical portion 79 provides for a restricted rate of flow of fluid under pressure from the corresponding brake cylinder device 5 to atmosphere when a brake release is effected by increasing the pressure in the brake pipe 2 to the normal charged pressure carried therein.

If it is desired to retain a certain chosen pressure in the brake cylinder devices 5 when a brake release and recharge of the brake equipment is effected while the train is descending a long grade, prior to beginning the descent the train will be stopped and a trainman standing at either side of each car will, by gripping the corresponding handle 62 with the fingers of his hand, manually rotate this handle in a clockwise direction, as viewed in FIG. 4, from the position it occupies to the position in which the pointer 63 of this handle is in alignment with the numeral 20 on the corresponding escutcheon plate.

As one or the other of the handles 62 is rotated to the position in which the pointer 63 thereof is in alignment with the numeral 20 on the corresponding escutcheon plate, the cam element 82 is rotated to the position shown in FIG. 7 via the corresponding operating rod 54. As the cam element 82 is thus rotated to the position shown in FIG. 7 in which the lower end of the stem 46 abuts the third flat surface 84 on the cam element 82, which surface 84 is farther from the axis of the cam element 82 than the flat surfaces 81 and 83, the stem 46, cylindrical follower member 44, spring 42 and poppet-type valve 78 are moved upwardly until the O-ring 41 carried by the valve 78 is moved into seating contact with the annular valve seat 32 after which the spring 42 is compressed until the cylindrical follower member 44 and its stem 46 reach the position shown in FIG. 7. As the spring 42 is thus compressed, it is rendered effective to bias the O-ring 41 carried by the poppet-type valve 78 against the annular valve seat 32 with sufficient force to provide a seal which prevents flow of fluid under pressure from the counterbore 30 to the counterbore 31.

So long as the poppet-type valve 78 is seated on the annular valve seat 32, whenever a brake release is effected by increasing the pressure in the brake pipe 2 to its normal charged value, fluid under pressure will be released from the corresponding brake cylinder device 5 to atmosphere via the check valve 22 of the brake cylinder pressure retaining valve device 77 in the same manner as hereinbefore described in detail in connection with the first embodiment of the invention until the pressure in the brake cylinder device 5 is reduced to a chosen value which, for example, may be twenty pounds per square inch as aforestated in connection with the operation of the brake cylinder pressure retaining valve device 6.

Description—FIGS. 8 to 10

FIGS. 8 to 10, inclusive, of the drawings show a three-position brake cylinder pressure retaining valve device comprising a third embodiment of the invention. The three-position brake cylinder pressure retaining valve device shown in FIGS. 8 to 10, inclusive, is identical in construction to the three-position brake cylinder pressure retaining valve device shown in FIGS. 5 to 7, inclusive, except for a lost-motion connection between a cam-operated cylindrical follower member and a valve which lost-motion connection will be hereinafter described in detail. Accordingly, like reference numerals have been used to designate the structure shown in FIGS. 8 to 10, inclusive, which is identical with that shown in FIGS. 5 to 7, inclusive, and already described. Only such features of the structure and operation of the embodiment of FIGS. 8 to 10, inclusive, which differ from that of the embodiment of FIGS. 5 to 7, inclusive, will be hereinafter described.

According to the third embodiment of the invention shown in FIGS. 8 to 10, inclusive, a three-position brake cylinder pressure retaining valve device 85 comprises a poppet-type valve 86 that replaces the poppet-type valve 78 of the three-position brake cylinder pressure retaining valve device shown in FIGS. 5 to 7, inclusive.

The poppet-type valve 86 is provided with a valve stem 87 that extends through a bore 88 formed in a cylindrical follower member 89 and a stem 90 integral therewith it being understood that this cylindrical follower member 89 and stem 90 replace respectively the cylindrical follower member 44 and its stem 46 of the three-position brake cylinder pressure retaining valve device 77 shown in FIGS. 5 to 7, inclusive. Follower member 89 is preferably provided on its outer surface with longitudinal grooves or flutes, as shown.

The lower end of the stem 87 extends into a counterbore 91 coaxial with the bore 88 and extending upward from the lower end of the stem 90. This lower end of the stem 87 is provided with external screw threads (not shown) for receiving in screw-threaded engagement therewith a nut 92.

The cylindrical follower member 89 is provided with two counterbores 93 and 94 of unequal diameter and coaxial with the bore 88 therein. Disposed in surrounding relation to the valve stem 87 and interposed between the poppet-type valve 86 and the bottom of the counterbore 93 of smaller diameter is a spring 95 that normally is effective to bias the nut 92 against a shoulder formed by the upper end of the counterbore 91.

Like the poppet-type valve 78 in the second embodiment of the invention, the poppet-type valve 86 is provided with a cylindrical portion 79 and a fluted portion 80, the latter being slidably disposed in the counterbore 30 in the body 13. The poppet-type valve 86 is also provided with an annular groove for receiving an O-ring 41 that is adapted to make a seal with the annular valve seat 32 when the poppet-type valve 86 is moved from the position in which it is shown in FIG. 8 to the position shown in FIG. 10 in a manner hereinafter described in detail.

*Operation—FIGS. 8 to 10*

As in the second embodiment of the invention, assuming that the handles 62 are disposed in the non-pressure retaining position in which the pointer 63 of each handle is in alignment with the numeral 0 on the corresponding escutcheon plate, it will be understood that the cam element 82 occupies the position shown in FIG. 8 so that the lower end of the stem 90 of the cylindrical follower member 89 rests on the flat surface 81 of the cam element 82 as shown in this figure. In this position of the cam element 82 and the cylindrical follower element 89, the spring 95 is effective to bias the poppet-type valve 86, stem 87 and nut 92 in an upward direction to the position shown in FIG. 8 in which position the nut 92 is biased against the shoulder formed by the upper end of the counterbore 91 in the stem 90 of the cylindrical member 89, and the cylindrical portion 79 of the poppet-type valve 86 is disposed below the lower end of the counterbore 30 in the body 13 of the cartridge-type retaining valve mechanism. Consequently, the poppet-type valve 86 is disposed below the annular valve seat 32 with the O-ring 41 carried by this poppet-type valve out of seating contact with this valve seat so that an unrestricted communication is established between the counterbores 30 and 41. Accordingly, when a brake release is effected, fluid under pressure flows unrestrictedly from the brake cylinder device 5 to atmosphere, as in the previous embodiments of the invention, until the pressure in the brake cylinder device 5 is reduced to substantially atmospheric pressure.

If it is desired to provide a slow or restricted rate of release of fluid under pressure from the brake cylinder devices 5 when a brake release and recharge of the brake equipment is effected while a train is descending a long grade, prior to beginning the descent the train will be stopped and a trainman, in the manner hereinbefore described in detail in connection with the second embodiment of the invention, will effect rotation of the cam element 82 to the position shown in FIG. 9 of the drawings. In this position of the cam element 82 the lower end of the stem 90 abuts the flat surface 83 on the cam element 82. Since the flat surface 83 is farther from the axis of rotation of the cam element 82 than is the flat surface 81 on this cam element, it is apparent that as the cam element 82 is manually rotated counterclockwise by the trainman from the position shown in FIG. 8 to the position shown in FIG. 9, the stem 90, cylindrical follower member 89, spring 95, poppet-type valve 86, valve stem 87, nut 92, cylindrical portion 79 and fluted portion 80 are moved from the position shown in FIG. 8 to the position shown in FIG. 9 in which position the upper end of the cylindrical portion 79 of the poppet-type valve 86 is disposed within the lower end of the counterbore 30.

Accordingly, as hereinbefore explained in detail in connection with the second embodiment of the invention, while the upper end of the cylindrical portion 79 of the poppet-type valve 86 is disposed within the lower end of the counterbore 30, this cylindrical portion 79 provides for a restricted rate of flow of fluid under pressure from the corresponding brake cylinder device 5 to atmosphere whenever a brake release is effected.

Should it be desired to retain a certain chosen pressure in the brake cylinder device t5 when a brake release and recharge of the brake equipment is effected while the train is descending a long grade, the train will be stopped prior to beginning the descent and a trainman, in the manner hereinbefore described in detail in connection with the second embodiment of the invention, will effect rotation of the cam element 82 to the position shown in FIG. 10 of the drawings.

As the cam element 82 is rotated to the position shown in FIG. 10 in which the lower end of the stem 90 abuts the flat surface 84 on the cam element 82, which flat surface 84 is farther from the axis of rotation of the cam element 82 than the flat surfaces 81 and 83, the stem 90, cylindrical follower member 89, spring 95, poppet-type valve 86, valve stem 87, nut 92, cylindrical portion 79 and fluted portion 80 are moved upwardly until the O-ring 41 carried by the poppet-type valve 86 is moved into seating contact with the annular valve seat 32 to close communication between counterbores 30 and 31. As the cam element 82 continues to rotate, subsequent to the O-ring 41 carried by the poppet-type valve 86 being moved into seating contact with the annular valve seat 32, until it reaches the position shown in FIG. 10, the stem 90 and cylindrical follower member 89 are moved upwardly relative to the poppet-type valve 86 and valve stem 87 until they reach the position in which they are shown in FIG. 10 thereby compressing the spring 95 so that it is effective to bias the O-ring 41 against the seating surface of the annular valve seat 32 to make a seal therewith thereby preventing flow of fluid under pressure from counterbore 30 to counterbore 31.

Now when a brake release is effected in the manner hereinbefore described, fluid under pressure will be released at an unrestricted rate from each brake cylinder device 5 to atmosphere via the check valve 22 of the corresponding brake cylinder pressure retaining valve device 85 until the pressure in each brake cylinder device is reduced to the aforementioned twenty pounds per square inch at which time the spring 23 will move the check valve 22 into seating contact with the annular valve seat 21 to prevent a further reduction in pressure in the brake cylinder device. Thus a pressure of, for example, twenty pounds per square inch, is retained in each brake cylinder device to maintain the brakes applied while the brake equipment is recharged as in the previous embodiments of the invention.

From the foregoing, it is apparent that the brake cylinder pressure retaining valve device 85 is operative accordingly as the handles 62 are manually positioned successively in three positions to provide for a complete release of fluid under pressure from the corresponding brake cylinder device at either an unrestricted or a restricted rate or a partial release at an unrestricted rate down to a chosen pressure in the brake cylinder device, when the brake pipe 2 is recharged to its normal charged value subsequent to a brake application to cause the brake controlling device 1 to return to its brake release position.

It should be noted that if the cam element 82 is manually rotated reversely or clockwise from the position shown in FIG. 10 to the position shown in either FIG. 9 or FIG. 8, the stem 87 and nut 92 are always effective to pull the valve 86, the cylindrical portion 79 and fluted portion 80 downwardly so that the valve 86 is unseated and moved away from the annular valve seat 32 as the cylindrical follower member 89 is moved downwardly successively by the spring 95 and the force of gravity to maintain the lower end of the stem 90 in contact with the flat surfaces formed on the cam element 82. The stem 87 and nut 92 thus insure that the valve 86 cannot stick to its annular valve seat 32 and thus remain closed whenever the cam element 82 is manually rotated clockwise from the position shown in FIG. 10 to either one of its other positions which sticking could possibly occur with the valves 40 and 78 included respectively in the first and second embodiments of the invention.

Having now described the invention, what I claim as new and desire to secure by Letters Patent is:

1. A pressure retaining valve device comprising:
   (a) a casing,
   (b) an inlet port in the casing connectable to a fluid pressure supply,
   (c) check valve means constantly open to said inlet port and unseated responsively to the fluid pressure supplied to said inlet port and past which the fluid under pressure may flow to atmosphere,
   (d) a valve device having one position in which it opens a communication in by-pass of said check valve means via which fluid under pressure supplied to said inlet port may also be exhausted to atmosphere concurrently with flow past said check valve means to atmosphere and having a second position in which it closes said by-pass communication to thereby limit the exhaust of fluid under pressure from the inlet port in the casing to atmosphere only past said check valve means, and
   (e) manually operated means for causing operation of said valve device to either of its said one and said second positions.

2. For use with a brake cylinder device to selectively release fluid under pressure therefrom and retain a chosen fluid under pressure therein, a pressure retaining valve device comprising,
   (a) a casing,
   (b) an inlet port in the casing connectable to a brake cylinder device,
   (c) check valve means constantly open to said inlet port, resiliently biased to a seated position, and unseated responsively to fluid under pressure, supplied to said inlet port from a brake cylinder device to relieve the pressure in the brake cylinder device down to a certain predetermined pressure by flow past said check valve means to atmosphere,
   (d) a valve device having one position in which it opens a communication in by-pass of said check valve means via which fluid under pressure supplied to said inlet port from a brake cylinder device may also be exhausted to atmosphere concurrently with flow past said check valve means to atmosphere and having a second position in which it closes said by-pass communication to thereby limit the exhaust of said value device to either of its said one and said fluid under pressure from the brake cylinder device to atmosphere only past said check valve means, and
   (e) manually operated means for causing operation of said valve device to either of its said one and said second positions.

3. A pressure retaining valve device comprising:
   (a) a hollow casing provided with a longitudinal through bore having a shoulder,
   (b) a cap member removably secured to said casing to close one end of said bore, the other end remaining in communication with atmosphere,
   (c) a unitary valve mechanism installable in and removable from said bore in said hollow casing as a unit through said one end of said bore while said cap member is removed from said casing, said valve mechanism being positioned in contact with said shoulder by said cap member when secured to said casing to provide a predetermined position of said mechanism relative to said casing, said unitary valve mechanism comprising:
      (i) a cylindrical member having a chamber to which fluid under pressure may be supplied and out of which opens two communications via which fluid under pressure may flow from said chamber to the other end of said through bore in said casing and thence to atmosphere, there being a valve seat formed on said member at the exterior end of each of said communications,
      (ii) a check valve cooperating with one of said valve seats to control flow of fluid under pressure from said chamber via the corresponding communication,
      (iii) spring means normally biasing said check valve against said one valve seat, said spring means including a spring seat removably secured to said member, and
      (iv) valve means cooperative with the other of said valve seats for controlling the flow of fluid under pressure from said chamber via the other of said communications, said valve means being manually movable selectively to either of two positions in one of which fluid under pressure may flow from said chamber through the other of said communications to atmosphere in by-pass relation to said check valve and in the other of which fluid under pressure may flow from said chamber only through said one communication to atmosphere past said check valve which is unseated responsively to fluid pressure in said chamber until the pressure in said chamber is reduced to a certain chosen pressure whereupon said check valve is reseated on said one valve seat.

4. A pressure retaining valve device comprising:
   (a) a hollow casing provided with a longitudinal through bore having a shoulder,
   (b) a cap member removably secured to said casing to close one end of said bore, the other end remaining in communication with atmosphere,
   (c) a unitary valve mechanism installable in and removable from said bore in said hollow casing as a unit through said one end of said bore while said cap member is removed from said casing, said valve mechanism being positioned in contact with said shoulder by said cap member when secured to said casing to provide a predetermined position of said mechanism relative to said casing, said unitary valve mechanism comprising:
      (i) a member having a chamber to which fluid under pressure may be supplied and out of which opens two communications via which fluid under pressure may flow from said chamber to the other end of said through bore in said casing and thence to atmosphere, there being a valve seat formed on said member at the exterior end of each of said communications,
      (ii) a check valve cooperating with one of said valve seats to control flow of fluid under pressure from said chamber via the corresponding communication,
      (iii) spring means normally biasing said check valve against said one valve seat, said spring means including a spring seat removably secured to said member, and
      (iv) valve means cooperative with the other of said valve seats for controlling the flow of fluid under pressure from said chamber via the other of said communications, said valve means being manually movable selectively to any one of three positions, in the first of which fluid under pressure may flow from said chamber through the other of said communications to atmosphere at an unrestricted rate in by-pass relation to said check valve, in the second of which fluid under pressure may flow from said chamber through the other of said communications to atmosphere at a restricted rate in by-pass relation to said check valve, and in the third of which fluid under pressure may flow from said chamber only through said one of said communications to atmosphere at an unrestricted rate past said check valve until the pressure in said chamber is reduced to a certain chosen pressure whereupon said check valve is reseated on its said one valve seat.

5. A pressure retaining valve device comprising:
 (a) a hollow casing,
 (b) an inlet port in the casing connectable to a fluid pressure supply,
 (c) biased check valve means unseated responsively to the fluid pressure supplied to said inlet port and past which the fluid under pressure may flow to atmosphere,
 (d) a valve device having one position in which it opens a communication in by-pass of said check valve means via which fluid under pressure supplied to said inlet port may flow to atmosphere and having a second position in which it closes said by-pass communication to thereby limit the flow of fluid under pressure from the inlet port in the casing to atmosphere only past said check valve means,
 (e) manually rotatable cam means for causing operation of said valve device to either of its said one and said second positions,
 (f) a follower linearly movable in one direction by said cam means, and
 (g) resilient means interposed between said follower and said valve device, said resilient means being ineffective on said valve device in said one position thereof and rendered effective in response to linear movement of said follower in said one direction by said cam means to exert, in the second position of said valve device, a force thereon to cause said valve device to close said by-pass communication.

6. A pressure retaining valve device, as claimed in claim 3, further characterized in that said cylindrical member and said casing having registering ports via which fluid under pressure is communicated to said chamber and by a pair of spaced-apart sealing means carried by said cylindrical member of said unitary valve mechanism and engaging the wall surface of the bore in said hollow casing on opposite sides of said registering ports in sealed relationship to seal said chamber against leakage of fluid under pressure therefrom.

7. A pressure retaining valve device, as claimed in claim 3, further characterized in that said valve means unseats from a second valve seat formed on said member to cause flow of fluid under pressure from said chamber to atmosphere in by-pass relation to said check valve, and seats on said second valve seat to prevent flow of fluid under pressure from said chamber to atmosphere except via said check valve.

8. A pressure retaining valve device, as claimed in claim 4, further characterized in that said valve means comprises a second valve seat formed at one end of a bore in said member, and a poppet-type valve having a stem formed with a cylindrical portion of a diameter smaller than that of said bore adjacent said valve and a fluted portion arranged in tandem relationship therewith for guided movement within said bore whereby in the first position of said valve means said cylindrical portion is disposed entirely outside said bore through which an unrestricted rate of flow of fluid under pressure from said chamber to atmosphere occurs, in the second position of said valve means said cylindrical portion is disposed at least partly inside said bore and said poppet-type valve is disposed out of seating contact with said second annular valve seat to provide for a restricted rate of flow of fluid under pressure from said chamber to atmosphere via the clearance space between the wall of the bore and said cylindrical portion, and in the third position of said valve means said poppet-type valve is disposed in seated contact with said second valve seat to prevent flow of fluid under pressure from said chamber to atmosphere except past said check valve, said flow occurring at an unrestricted rate to atmosphere past said check valve until the pressure in said chamber is reduced to said chosen pressure whereupon said check valve is reseated on the first said valve seat.

9. A pressure retaining valve device comprising:
 (a) a hollow casing, and
 (b) a unitary valve mechanism installable in and removable from said hollow casing as a unit, said valve mechanism comprising:
  (i) a member having a chamber to which fluid under pressure may be supplied and out of which opens two communications via which fluid under pressure may flow from said chamber to atmosphere,
  (ii) a spring-biased check valve arranged for cooperation with a valve seat on said member to control flow of fluid under pressure from said chamber via one of said communications,
  (iii) valve means controlling the flow of fluid under pressure from said chamber via the other of said communications, said valve means being manually movable selectively to any one of three positions, in the first of which fluid under pressure may flow through the other of said communications from said chamber to atmosphere at an unrestricted rate in by-pass relation to said check valve, in the second of which fluid under pressure may flow through the other of said communications from said chamber to atmosphere at a restricted rate in by-pass relation to said check valve, and in the third of which fluid under pressure may flow through said one of said communications from said chamber to atmosphere at an unrestricted rate past said check valve until the pressure in said chamber is reduced to a certain pressure whereupon said check valve is reseated on said valve seat,
  (iv) a manually rotatable cam having a plurality of cam surfaces,
  (v) a follower linearly movable by said cam to a plurality of positions corresponding respectively to said cam surfaces,
  (vi) means providing a lost-motion connection between said valve means and said follower,
  (vii) resilient means interposed between said follower and said valve means and yieldingly compressed upon lost-motion movement by said follower with respect to said valve means in one direction to yieldingly maintain the valve means in said third position, said lost-motion connection means being effective upon reaching the limit of its lost-motion movement with respect to said valve means in the reverse direction to positively move said valve means out of its third position successively to its second and first positions in correspondence with the rotation of said cam.

10. A pressure retaining valve device, as claimed in claim 9, wherein the means providing a lost-motion connection between the valve means and the follower is further characterized in that said follower has a through bore therein, and in that said valve means is provided with a stem extending through said bore and cooperating with said follower.

11. A brake cylinder pressure retaining valve device, as claimed in claim 9, further characterized in that said follower is slidably mounted in a bore in said member and by stop means carried by said member to limit movement of said follower relative to said member in said reverse direction.

References Cited

UNITED STATES PATENTS 1,856,209  5/1932  Campbell _____ 303—75 X
3,118,647  1/1964  Hasty _____ 137—599 X DUANE A. REGER, *Primary Examiner.*

PO-1050
(5/69)

UNITED STATES PATENT OFFICE
CERTIFICATE OF CORRECTION

Patent No. 3,407,010      Dated October 22, 1968

Inventor(s) Charles L. Weber, Jr.

It is certified that error appears in the above-identified patent and that said Letters Patent are hereby corrected as shown below:

Column 13, line 57, delete "said value device to either of its said one and said"

Column 15, line 46, erase "having" and insert --have--

Signed and sealed this 21st day of May 1974.

(SEAL)
Attest:

EDWARD M. FLETCHER, JR.       C. MARSHALL DANN
Attesting Officer      Commissioner of Patents

Disclaimer 3,407,010.—*Charles L. Weber, Jr.*, Irwin, Pa. BRAKE CYLINDER PRESSURE RETAINING VALVE. Patent dated Oct. 22, 1968. Disclaimer filed Nov. 11, 1974, by the assignee *Westinghouse Air Brake Company*.

Hereby enters this disclaimer to claims 1 and 2 of said patent.

[*Official Gazette April 29, 1975.*]